United States Patent
Li et al.

(10) Patent No.: US 11,729,813 B1
(45) Date of Patent: Aug. 15, 2023

(54) MULTIMEDIA SERVICE OVER AN EXTENDED RANGE WIRELESS LOCAL AREA NETWORK (WLAN) USING A MODULATION AND CODING SCHEME WITH SYMBOL REPETITION FOR HIGHER PRIORITY PORTIONS OF MEDIA FOR DATA

(71) Applicant: Amazon Technologies, Inc., Seattle, WA (US)

(72) Inventors: Haopeng Li, Fremont, CA (US); Chunho Lee, Sunnyvale, CA (US); Wei Feng, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 17/336,035

(22) Filed: Jun. 1, 2021

(51) Int. Cl.
*H04W 72/566* (2023.01)
*H04L 1/00* (2006.01)
(Continued)

(52) U.S. Cl.
CPC ......... *H04W 72/569* (2023.01); *H04L 1/0003* (2013.01); *H04W 72/1263* (2013.01); *H04W 74/02* (2013.01); *H04W 84/12* (2013.01)

(58) Field of Classification Search
CPC ......... H04W 72/1242; H04W 72/1263; H04W 74/02; H04W 84/12; H04W 72/569;
(Continued)

(56) References Cited

U.S. PATENT DOCUMENTS

| | | | | |
|---|---|---|---|---|
| 2008/0002777 A1* | 1/2008 | Hwang | .......... | H04N 21/234327 375/E7.091 |
| 2008/0025211 A1* | 1/2008 | Karaoguz | .............. | H04N 19/89 370/469 |

(Continued)

FOREIGN PATENT DOCUMENTS

GB          2426664 A  * 11/2006 ....... H04L 29/06027

OTHER PUBLICATIONS

Nazir et al., "Expanding Window Random Linear Codes for data partitioned H.264 video transmission over DVB-H network," 2011 18th IEEE International Conference on Image Processing, 2011, pp. 2205-2208 (Year: 2011).*

(Continued)

*Primary Examiner* — Un C Cho
*Assistant Examiner* — Lalita W Pace
(74) *Attorney, Agent, or Firm* — Lowenstein Sandler LLP (57) ABSTRACT

Technologies directed to providing multimedia service over an extended range Wireless Local Area Network (WLAN) (e.g., IEEE 802.11ah) are described. In one method, a first wireless device identifies a first portion of media data as having a first priority value and a second portion of the media data as having a second priority value that is less than the first priority value. The first wireless device modulates the first portion to obtain first modulated data using a first modulation and coding scheme (MCS) that has symbol repetition and modulates the second portion to obtain second modulated data using a second MCS in which there is no symbol repetition. The first wireless device sends the first modulated data to a second wireless device in the wireless network and sends the second modulated data to the second wireless device after sending the first modulated data.

18 Claims, 8 Drawing Sheets

(51) Int. Cl.
*H04W 74/02* (2009.01)
*H04W 72/1263* (2023.01)
*H04W 84/12* (2009.01)

(58) Field of Classification Search
CPC .... H04L 1/0003; H04N 19/66; H04N 19/187; H04N 19/129; H04N 19/188
See application file for complete search history.

(56) References Cited

U.S. PATENT DOCUMENTS

| | | | | |
|---|---|---|---|---|
| 2008/0064425 | A1* | 3/2008 | Kim | H04N 19/187 375/240.1 |
| 2008/0152003 | A1* | 6/2008 | Oguz | H04N 19/31 375/E7.199 |
| 2009/0305690 | A1* | 12/2009 | Yuda | H04B 7/0417 455/422.1 |
| 2012/0013748 | A1* | 1/2012 | Stanwood | H04L 47/2408 348/192 |
| 2013/0315163 | A1* | 11/2013 | Zhang | H04L 5/001 370/329 |
| 2013/0329658 | A1* | 12/2013 | Liu | H04W 74/04 370/329 |
| 2015/0110061 | A1* | 4/2015 | Park | H04W 72/0446 370/329 |
| 2015/0207834 | A1* | 7/2015 | Zhao | H04L 65/70 709/231 |
| 2019/0104276 | A1* | 4/2019 | Vu | H04N 21/426 |

OTHER PUBLICATIONS

Ali et al. "Data Partitioning Technique for Improved Video Prioritizatio," Computers 2017, 6(3), 23, pp. 1-19 (Year: 2017).*
Ksentini et al, "Improving H.264 video transmission in 802.11e EDCA," Proceedings. 14th International Conference on Computer Communications and Networks, 2005, pp. 381-386 (Year: 2005).*

* cited by examiner

MULTIMEDIA SERVICE OVER AN EXTENDED RANGE WIRELESS LOCAL AREA NETWORK (WLAN) USING A MODULATION AND CODING SCHEME WITH SYMBOL REPETITION FOR HIGHER PRIORITY PORTIONS OF MEDIA FOR DATA

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to providing multimedia service over an extended range Wireless Local Area Network (WLAN) (e.g., IEEE 802.11ah) are described. There is an increasing demand for more smart devices and Internet of Things (IoT) devices for the outdoors. A number of long-range network technologies, such as LoRa, NB-IoT, and Sub-1 GHz Bluetooth®, have been introduced. However, it is still challenging to deploy multimedia services over these long-range networks because the multimedia transmission requires high bandwidth, and most multimedia services are built on top of a Transmission Control Protocol and Internet Protocol (TCP/IP) stack, which is not supported by these long-range networks. Media data can be any type of media, including audio, video, text, animations, graphics, or the like. Multimedia transmission is a form of communication that combines different content forms such as text, audio, images, animations, or video into a single presentation, such as video podcasts, audio slideshows, animated videos, or the like. As described herein, the multimedia services described herein can send or receive data of any media type and any combination of different media types (referred to herein as "media data").

More specifically, multimedia transmission requires high bandwidth, and most long-range networks cannot provide the necessary bandwidth. For example, High-Definition (HD) video streams require a bandwidth of 4 Mbps with 30 frame rates, while Ultra-High-Definition (UHD) video streams require a bandwidth of at least 25 Mbps. The long-range networks can achieve a longer range by using narrow channel widths and symbol repetitions, which reduce the total data rate and payload size. The narrow channel widths make it challenging to achieve the data rates for the multimedia service. As described above, most multimedia services are built on top of the TCP/IP protocol stack. For example, HTTP Live Streaming (HLS) protocol or Real-Time Streaming Protocol, designed for establishing and controlling media sessions, is based on the TCP protocol. Real-time Transmission Protocol (RTP) for delivering video data is built on the User Datagram Protocol (UDP). The current long-range networks do not support TCP/IP.

The IEEE 802.11ah protocol, published in 2017 and called Wi-Fi HaLow, supports TCP/IP and specifies that each station (STA) supports at least 8.67 Mbps data rate as mandatory and supports up to 86.7 Mbps data rate per spatial stream. Despite the better performance and TCP/IP support, in a real environment, the channel conditions (e.g., noisy medium, channel fading, and inter-/intra-interference) could deteriorate the quality of multimedia service in IEEE 802.11ah network.

Aspects of the present disclosure address the above and other deficiencies by providing error-resilient features that support symbol repetitions on the most important portions of the media data, transmitting the most important portions of the media data on a time-division period, and transmitting less important portions of the media data in a contention period and without symbol repetition. A contention period is a period where multiple wireless devices contend with each other to access the channel. There is no guarantee of airtime for the wireless devices that are contending for access to the channel. The aspects of the present disclosure leverage some features of the IEEE 802.11ah protocol and H.264 as described below.

The IEEE 802.11ah protocol has a modulation scheme for robust transmission named Modulation and Coding Scheme (MCS) 10. MCS 10 uses Binary Phase Shift Keying (BPSK) with a 1/2 coding rate, 1 MHz channel bandwidth, and 2 times symbol repetition. MCS 10 is used for longer and more robust transmission. The video encoding standards Advanced Video Coding (AVC), also referred to as H.264, has a network-friendly feature for prioritized traffic transmissions called Data Partitioning (DP). DP is a feature for providing the ability to separate more important and less important syntax elements into different packets of data. In particular, H.264 standard can separate Video Coding Layer (VCL) and Network Abstraction Layer (NAL) for these network-friendly transmissions. For the NAL, DP can be applied to coded pictures. For DP, a coded picture can be separated into up to three different data partitions, referred to as DP_A, DP_B, and DP_C, in the order of importance. The DP_A contains the slice header information that includes Quality Parameter and motion vectors. Data Partitions B and C contain intra-coded slice macroblocks, respectively. DP_A is considered the most important data partition since DP_B and DP_C cannot be decoded without DP_A. The embodiments described herein provide a method of media transmission by a wireless device in which the wireless device transmits DP_A in H.264 or the header information in media using symbol repetitions in MCS 10. The DP_A is the most important, but the length is small enough to fit into MCS 10. A first byte of a NAL frame can be used to identify DP_A and a mapping scheme of DP_A. An IP Type of Service (TOS) field or virtual LAN (VLAN) tagging can also be used. By transmitting the DP_A using MCS 10, the perceived quality of the media data will increase.

The IEEE 802.11ah protocol has a time-division-based medium access method called restricted access window (RAW). An access point (AP) schedules one or multiple RAWs between two beacon frames. One RAW is divided into multiple RAW slots, and each RAW slot can be allocated to one or multiple STAs. During the slot time, only the allowed STA can transmit frames. Since only the allowed STA can transmit during allotted slot time, contentions can be minimized, and important parts of media streams can transmit without inter-interference during this time. The Scalable Video Coding (SVC) feature of H.264 can divide a video stream into subset bitstreams temporally (frame rate) or spatially (picture size). Flexible Macroblock Ordering (FMO) of H.264, also referred to as slice groups, is a technique for restructuring the ordering of the representation of the fundamental regions (macroblocks) in pictures. FMO can be considered an error/loss robustness feature. If the base layer of the video stream in SVC or at least one of the slice groups in FMO is reliably transmitted, the STA can continuously receive at least part of the video stream even with bad channel conditions. This can result in a better-perceived quality of service at the STA. The embodiments described herein provide a method of media transmission by a wireless device in which the wireless device supports both a time-division period and a contention period (e.g., IEEE 802.11ah RAW), transmitting important data of the media stream, such as DP_A, or DP_A and DP_B in H.264 Data Partitioning, at least one slice group in a coded picture (FMO) or a base layer (SVC) in the time-division period and transmitting less important data in the contention period.

Figure 1:
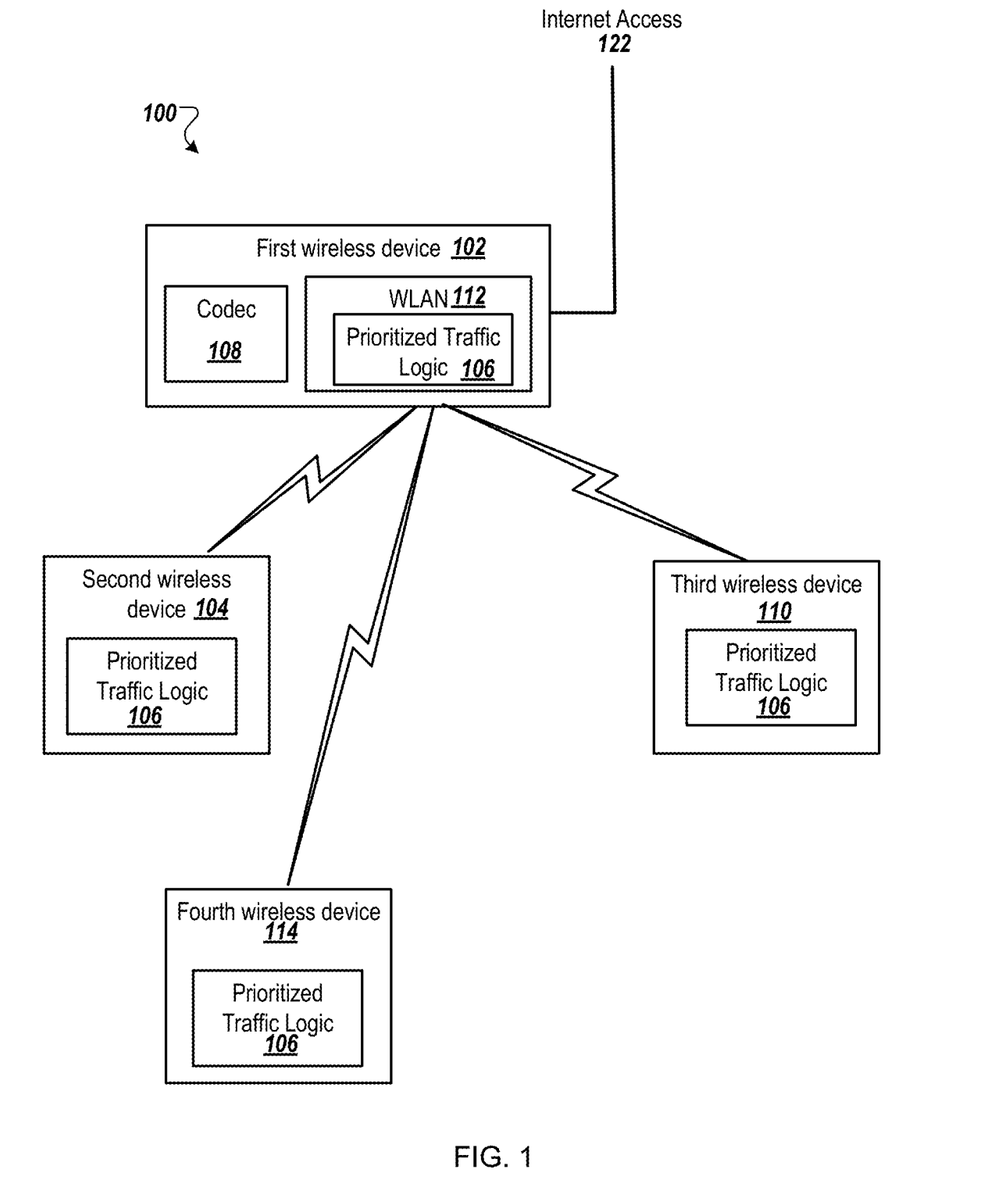
FIG. 1 is a network diagram of an extended-range wireless network with a first wireless device with prioritized traffic logic for providing media services to other wireless devices, according to at least one embodiment.

FIG. 1 is a network diagram of an extended-range wireless network with a first wireless device with prioritized traffic logic for providing media services to other wireless devices, according to at least one embodiment. In this embodiment, the first wireless device 102 and second wireless device 104 operate in the same channel. First wireless device 102 provides backhaul connectivity to the extended-range wireless network 100, such as using a wired or wireless connection 122 to the Internet. For example, the first wireless device 102 can be connected to a gateway or a modem via wired or wireless connection 122. Alternatively, the first wireless device 102 can be a router or a gateway and can provide internet access to the second wireless device 104, a third wireless device 110, and a fourth wireless device 114. First wireless device 102 can provide an access point to wireless devices 104, 110, 114, and other devices. The wireless devices 104, 110, 114 can be endpoint devices, client devices, or stations (STAs).

In at least one embodiment, to provide multimedia service over the extended-range wireless network 100, the first wireless device 102 and the second wireless device 104 include prioritized traffic logic 106. The prioritized traffic logic 106 can receive multiple partitions of media data from a codec (e.g., an encoder) and assign a first priority value to a first data partition, a second priority value to a second data partition, and a third priority value to a third data partition. The second priority value is lower than the first priority value, and the third priority value is lower than the second priority value. The prioritized traffic logic 106 generates first data from the first data partition using a first modulation and coding scheme (MCS) with symbol repetition. The first MCS has at least two times symbol repetitions. In at least one embodiment, the first MCS is MCS 10, where 10 represents the index. MCS 10 uses BPSK with a 1/2 coding rate, 1 MHz channel bandwidth, and 2 times symbol repetition. The prioritized traffic logic 106 generates second data from the second data partition using the first MCS. The prioritized traffic logic 106 generates third data from the third data partition using a second MCS without symbol repetition. In at least one embodiment, a mapping scheme can be used to map urgent notifications and H.265 data partitions A to a higher priority than other partitions and can be modulated using symbol repetition, such as MCS 10, as the urgent notifications and H.265 data partitions A contains the more important information in the media data.

In at least one embodiment, the prioritized traffic logic 106 sends the first data and the second data in a first period. The first period can be a restricted access window (RAW) in which only the first wireless device is scheduled to transmit. In at least one embodiment, the first period is considered a contention-less period given that the specific wireless devices are scheduled to transmit in specific slots of the contention-less period. A contention-less period is a period in which a specific set of one or more wireless devices is scheduled for transmissions to guarantee airtime for the specific set of one or more wireless devices. The prioritized traffic logic 106 sends the third data in a second period subsequent to the first period. The second period can be a contention period (e.g., a non-restricted access window (non-RAW) in which no wireless device is specifically scheduled to transmit). The second period can be considered a contention period, given the multiple wireless devices can contend for access to the same wireless medium.

In addition, as illustrated in FIG. 1, third wireless device 110 and fourth wireless device 114 include prioritized traffic logic 106. Alternatively, the extended-range wireless network wireless network 100 can include fewer or more than the first wireless device 102, second wireless device 104, third wireless device 110, and the fourth wireless device 114.

In at least one embodiment, the second wireless device 104 is a security camera device that captures audio and video. The second wireless device 104 can send the audio and video according to the prioritized traffic scheme as described herein. In at least one embodiment, the first wireless device 102 streams video to the second wireless device 104 using the prioritized traffic logic 106. In at least one embodiment, the first wireless device 102 is a camera device, such as a doorbell device. The camera device can transfer data to other wireless devices in a wireless network. A camera device can capture video and audio. For example, the camera device can detect a motion event and alert the other devices quickly without going through a cloud service. In another example, one of the other devices can detect an event and report the event to the controller, and the controller can notify all controlees of the detected event. In other embodiments, one or more wireless devices 102, 104, 110, and 114 can be a computer, a smart phone, a voice-controlled device, a wireless display, a wireless speaker, a game console, a wireless game pad, or the like.

In at least one embodiment, the first wireless device 102 includes a codec 108 and a WLAN radio 112. The codec 108 can be part of a host processor or can be a standalone device. The codec 108 can encode or decode media data and can store the encoded or decoded media data in one or more memory devices. The codec 108 receives media data and generates the data partitions, including a first data partition that includes a quality parameter and motion vectors in header information, a second data partition that includes intra-coded data, and a third data partition that includes inter-coded data. The WLAN radio 112 can include a baseband processor and a transceiver. The baseband processor can include the prioritized traffic logic 106.

In at least one embodiment, the media data is part of a bitstream, and a codec 108 generates the first data partition and the second data partition by dividing the bitstream into a first subset bitstream temporally (e.g., frame rate) or spatially (e.g., picture size) using a scalable video coding (SVC) feature. The first subset bitstream is a base layer of the media data. The codec 108 generates the third data partition by dividing the bitstream into a second subset bitstream using the SVC feature. The second subset bitstream is a second layer of the media data. The baseband processor sends the base layer in the first period and sends the second layer in the second period. As described herein, the first period can be a RAW, and the second period can be a non-RAW.

In at least one embodiment, the media data is part of a bitstream, and a codec 108 generates the first data partition and the second data partition by dividing the bitstream into a first slice group using a Flexible Macroblock Ordering (FMO) feature. The codec 108 generates the third data partition by dividing the bitstream into a second slice group using the FMO feature. The baseband processor sends the first data and the second data as the first slice group layer in the first period and sends the third data as the second slice group in the second period. As described herein, the first period can be a RAW, and the second period can be a non-RAW.

In at least one embodiment, the prioritized traffic logic 106 prioritizes traffic transmission using symbol repetition. MCS 10 in IEEE 802.11ah is based on BPSK modulation with 1/2 coding rate, 1 MHz channel bandwidth, and 2 times symbol repetition for robust transmission. The symbol repetition is used for reliability by transmitting one symbol twice. Repeating the symbols increases reliability by allowing a receiver to have better packet detection (e.g., by at least 3 dB). MCS 10 also can be used to reduce packet collisions due to interference since the receiver can have more budget to receive the packet. The prioritized traffic logic 106 can assign MCS 10 to transmit the most important portions of the media data to enhance the quality at the receiver side. As described above, H.264 separates VCL and NAL for network-friendly transmissions of media data. On NAL, data partitioning (DP) can be applied to the coded pictures. With DP, a coded picture can be separated into three different partitions, including DP_A, DP_B, and DP_C by importance. A DP_A contains slice header information. The header information can include a quality parameter, motion vectors (MV), or other header information. A Data partition B contains intra-coded slice macro blocks. A Data partition C includes inter-coded macro blocks. Since DP_B and DP_C cannot be decoded without DP_A, DP_A is considered the most important DP, and a network should prevent any packet loss on DP_A. Examples of the data partitions are shown in FIG. 2.

Figure 2:
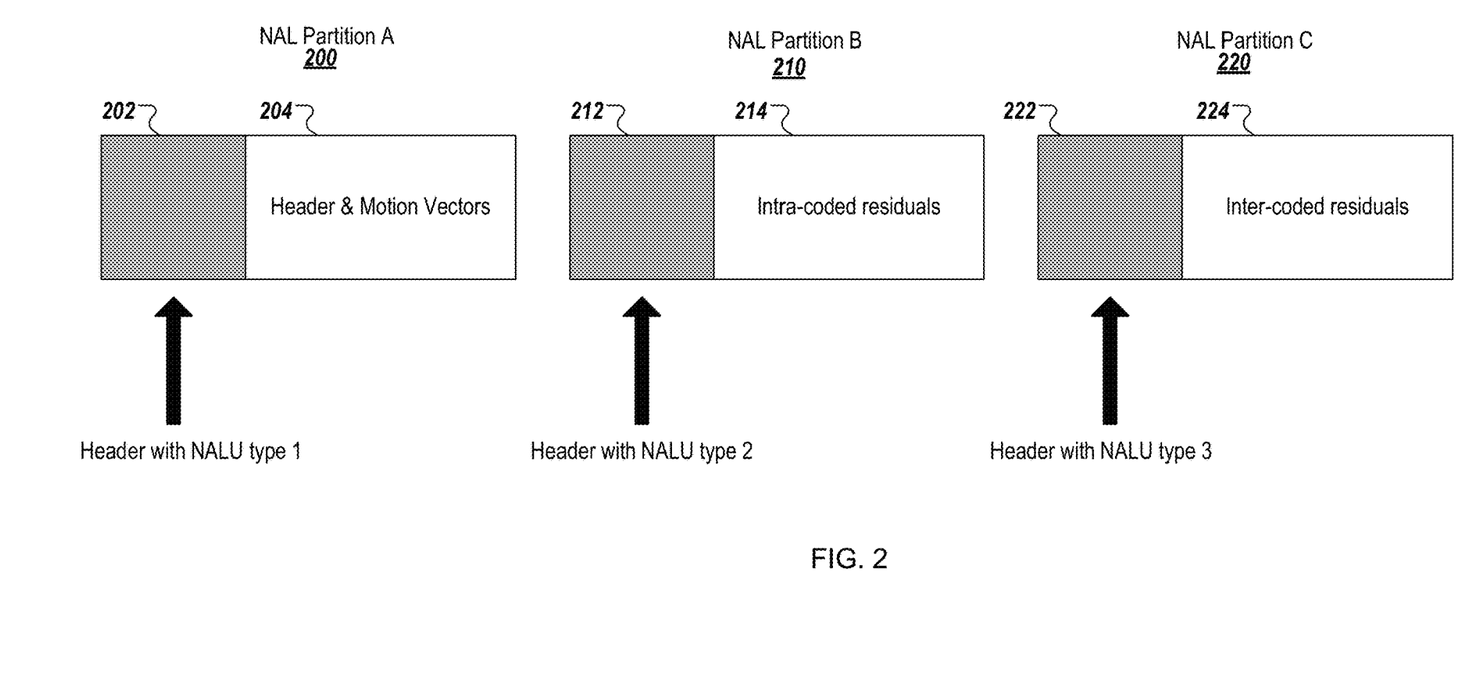
FIG. 2 illustrates three Network Abstraction Layer (NAL) partitions with different NAL Unit (NALU) types, according to at least one embodiment.

FIG. 2 illustrates three Network Abstraction Layer (NAL) partitions with different NAL Unit (NALU) types, according to at least one embodiment. As shown in FIG. 2, there are three data partitions in media data: NAL Partition A 200, NAL Partition B 210, and NAL Partition C 220. NAL Partition A 200 includes a first header 202 with a first NALU type (e.g., DP_A) and a payload with header information (e.g., quality parameter) and motion vectors (MVs) 204. NAL Partition B 210 includes a second header 212 with a second NALU type (e.g., DP_B) and a payload with intra-coded residuals 214. NAL Partition C 220 includes a third header 222 with a third NALU type (e.g., DP_A) and a payload with inter-coded residuals 224. Each of the first, second, and third headers 202, 212, 222, indicates which NAL partition the respective partition it is. The prioritized traffic logic 106 can use these headers for a mapping scheme that maps urgent notifications and H.264 data partitions A to have a higher priority than H.264 data partitions B and maps H.264 data partitions B to have a higher priority than H.264 partitions C. The prioritized traffic logic 106 assigns MCS 10 to the partitions and urgent notifications with higher priority (e.g., data partitions A and B). The prioritized traffic logic 106 assigns a different MCS to the partitions having lower priorities (e.g., data partition C). The higher priority partitions are transmitted over a duplicated transmit mode (e.g., MCS 10) on IEEE 802.11ah. The lower priority partitions are transmitted using other assigned MCS that do not repeat symbols like the duplicated transmit mode, such as illustrated in FIG. 3.

Figure 3:
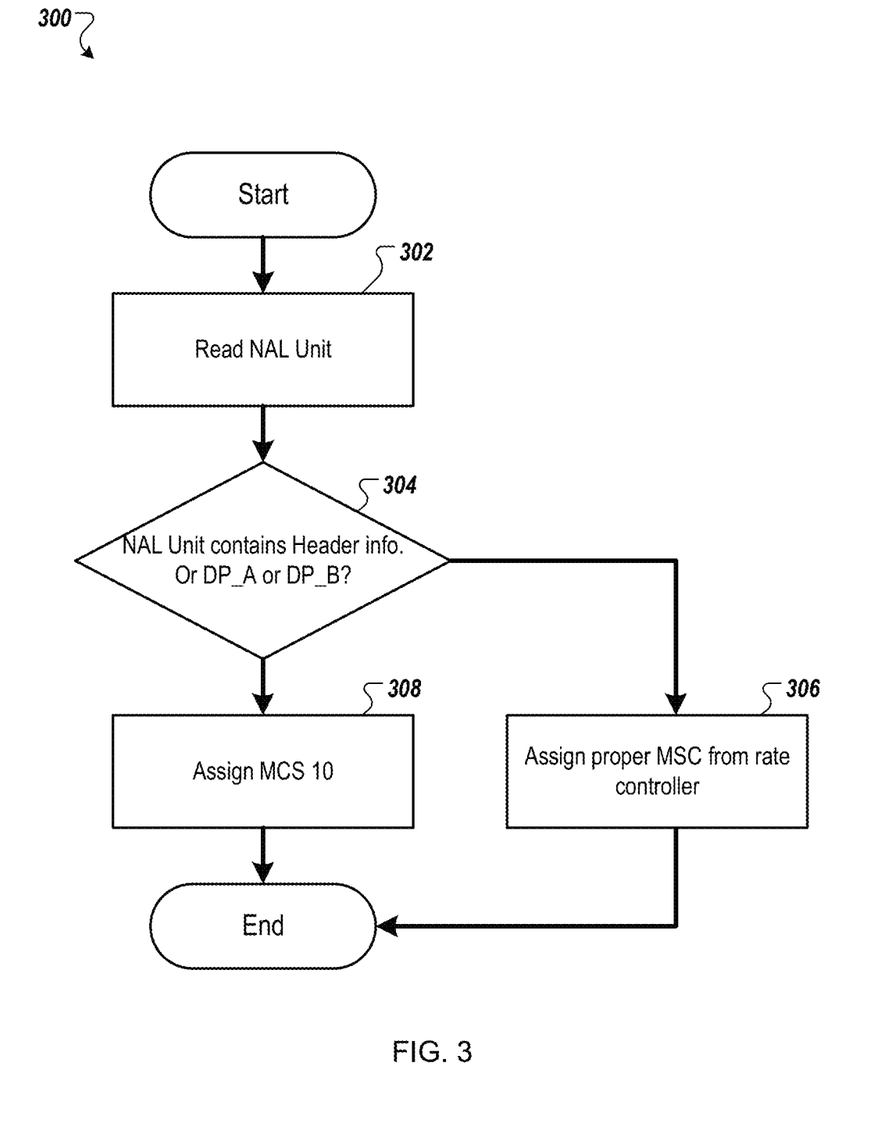
FIG. 3 is a flow diagram of a method of prioritizing traffic based on NALU types, according to at least one embodiment.

FIG. 3 is a flow diagram of a method of prioritizing traffic based on NALU types, according to at least one embodiment. The method 300 may be performed by processing logic that comprises hardware (e.g., circuitry, dedicated logic, programmable logic, microcode, etc.), software, firmware, or a combination thereof. In one embodiment, the method 300 may be performed by the first wireless device 102 of FIG. 1. In another embodiment, the method 300 is performed by the prioritized traffic logic 106 of FIG. 1. In another embodiment, the method 300 is performed by any wireless device described herein.

Referring back to FIG. 3, the processing logic of a first wireless device begins the method 300 by reading a NALU (block 302). The processing logic determines whether the NALU contains header information or DP_A (block 304). In another embodiment, the processing logic can determine if the NALU contains the header information, DP_A, or DP_B. If the NALU contains the header information or DP_A at block 304 (or header information, DP_A, or DP_B), the processing logic assigns MCS 10 to the NALU (block 308), and the method 300 ends. However, if the processing logic determines that the NALU contains DP_C (or DP_B in some cases), the processing logic assigns a proper MCS from a rate controller (block 306), and the method 300 ends. The MCS assigned to the DP_C does not do symbol repetition like MCS 10. The method 300 can be repeated for each of the NALUs in a bitstream.

It should be noted that the scheme above is different than other approaches, such as Automatic Repeat Request (ARQ) based on IP. These approaches perform IP packetization twice and require MAC contention to be performed twice.

Also, ARQ requires media streaming and notification servers to be aware of the ARQ scheme. In contrast, the symbol repetition in the embodiments described herein performs IP packetization once, and MAC contention needs to be performed only once. The embodiments described herein can operate with any media streaming or notification servers unaware of the scheme.

In at least one embodiment, the prioritized traffic logic 106 prioritizes traffic transmission using time allocation. IEEE 802.11ah has a medium access method based on time allocation called restricted access window (RAW) and divides stations (STAs) into different groups. An access point (AP) can schedule one or more RAWs between two beacon frames, referred to as the Target Beacon Transmission Time (TBTT). One RAW is divided into multiple RAW slots, and each RAW slot can be allocated to one or more multiple STAs. During a RAW slot, only the scheduled STA is allowed to transmit frames. An AP can assign a RAW in a periodic manner by announcing RAW assignment sub-field with a period RAW indication sub-field being set to 1 of a RAW parameter set (RPS) element. An RPS element defines a duration of a RAW, a number of RAW groups within the beacon interval, their duration, a number of equal-sized slots within each group, and the assigned stations to the slots. An example RAW structure is illustrated in FIG. 4.

Figure 4:
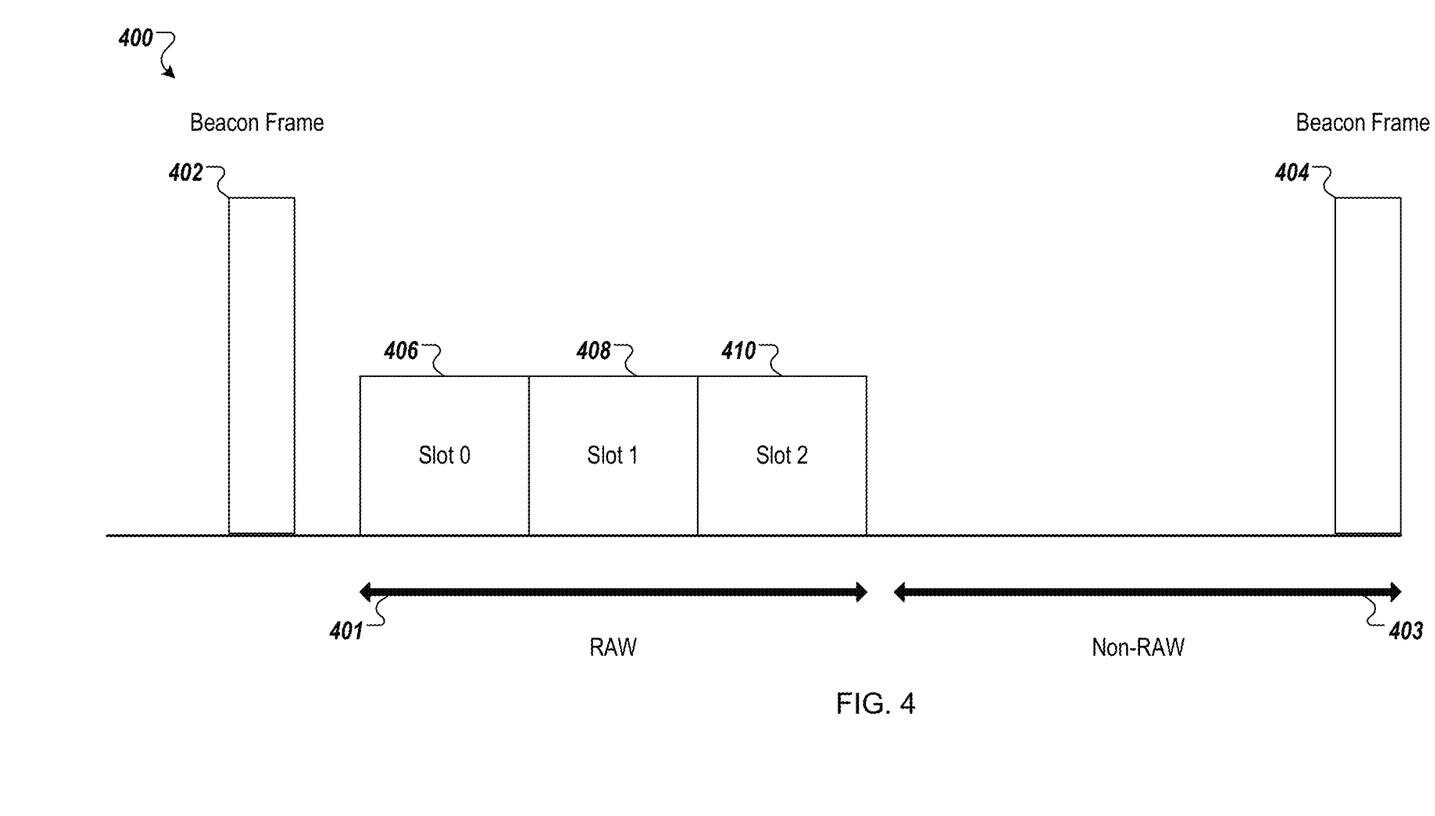
FIG. 4 is a timing diagram showing multiple slots in a restricted access window (RAW) structure between two beacon frames, according to at least one embodiment.

FIG. 4 is a timing diagram showing multiple slots in a RAW structure 400 between two beacon frames 402, 404, according to at least one embodiment. Information of the RAW structure 400 can be sent in at least the first beacon frame 402. The second beacon frame 404 can define the same RAW structure 400 or a different RAW structure. The RAW structure 400 has a first period 401 and a second period 403. The first period 401 can be a contention-less period given that only allowed stations can communicate in their specified slot in the first period 401. The first period 401 is also referred to as a RAW. The second period 403 is referred to as non-RAW, and any wireless device can contend for access to the medium during the second period 403. The RAW structure 400 defines a first slot 406 for a first set of one or more wireless devices, a second slot 408 for a second set of one or more wireless devices, and a third slot 410 for a third set of one or more wireless devices. In this embodiment, the first wireless device 102 (or the second wireless device 104) is assigned to the first slot 406. Since only allowed stations in the first set of wireless devices are allowed to transmit during the allotted first slot 406, contentions can be minimized. The important portions of the media data can be transmitted without inter-interference during this time. As described herein, H.264 Scalable Video Coding divides a video stream into subset bitstreams temporally (frame rate) or spatially (picture size). H.264 Flexible Macroblock Ordering (FMO) allows to have slice groups. If a base layer of a video stream in SVC or at least a first slice group in FMO is reliably transmitted during the first slot 406, the other device can receive the most important portions of the video stream even in bad channel conditions. If the channel conditions are good, the other less important portions can also be received by the other device. This results in a better-perceived quality of service at the other device. Table 1 includes some example portions of a media data that can be transmitted during the contention-less period (RAW) and portions of the media data transmitted during a contention period (Non-RAW) for various features.

TABLE 1

| Contention-less Period (RAW) | Contention Period (Non-RAW) |
| --- | --- |
| H.264 DP - DP_A, DP_B | H.264 DP - DP_C |
| H.264 FMO - Slice Group 1 | H.264 FMO - other slice groups |
| SVC - Base Layer | SVC - other layers |

In at least one embodiment, the prioritized traffic logic 106 can add a priority tag to each of the different portions of media data, including a first priority tag to those portions that are to be transmitted in the contention-less period (RAW) (e.g., 401) and a second priority tag to those portions that are to be transmitted in the contention period (e.g., 403). In at least one embodiment, a dedicated queue can be used for the portions with the first priority tag to be transmitted during the contention-less period (RAW) (e.g., 401). A set of other queues (e.g., IEEE 802.11 queues) can be used for the other portions with the second priority tag to be transmitted during the contention period (Non-RAW) (e.g., 403), as illustrated in FIG. 5.

Figure 5:
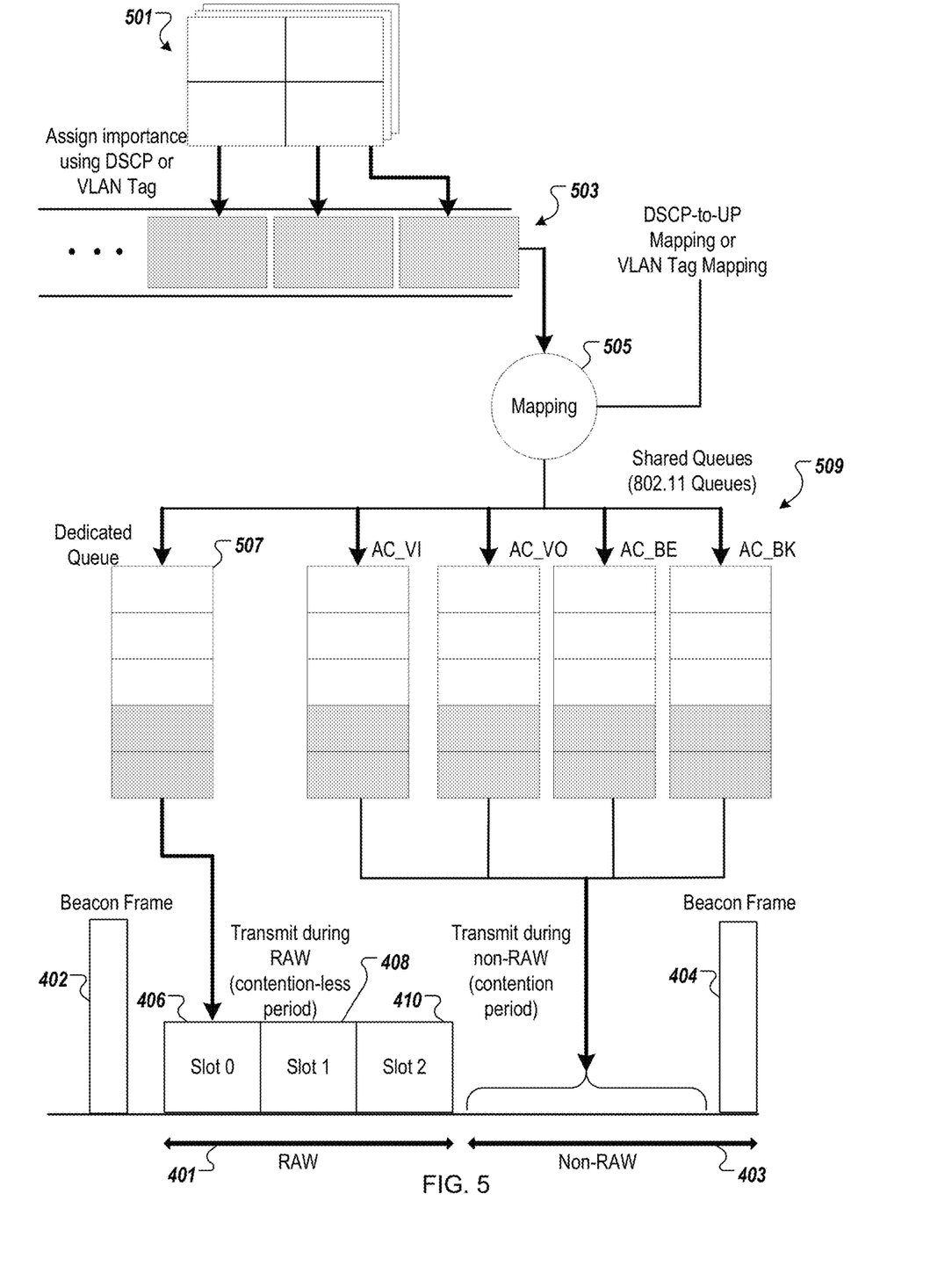
FIG. 5 is a flow diagram illustrating tag mapping and prioritizing traffic using a dedicated queue for higher-priority traffic, according to at least one embodiment.

FIG. 5 is a flow diagram illustrating tag mapping and prioritizing traffic using a dedicated queue for higher-priority traffic, according to at least one embodiment. The flow diagram starts with an image or a group of images 501 being encoded. As part of the encoding processing, the image or group of images 501 is partitioned into multiple data partitions 503. A priority value or level can be assigned to each of the data partitions 503 using DSCP or VLAN tags. Alternatively, each of the data partitions can be associated with a NALU type that specifies different data partitions of the media data (e.g., DP_A, DP_B, and DP_C). Each partition can have a header that specifies the NALU type for mapping to different priority levels for transmission. Once tags have been assigned to the data partitions 503, a mapping process 505 can map the different tags to one of the multiple queues. The mapping process 505 can map tags associated with a first priority value to a first queue 507. The first queue 507 is a dedicated queue that is dedicated to data partitions having the first priority value that are to be transmitted during the contention-less period (e.g., 401). The mapping process 505 can map other tags associated with a second priority value or lower priority values to one of a set of shared queues 509. The set of shared queues is used for the data partitions that are to be transmitted during the contention period (e.g., 403). In at least one embodiment, the set of shared queues 509 include typical IEEE 802.11 queues for prioritizing traffic according to Quality of Service (QoS) features according to four Access Categories (AC), including voice (AC_VO), video (AC_VI), best effort (AC_BE), and background (AC_BK). As illustrated in FIG. 5, the set of shared queues 509 can include a queue for each of the four Access Categories.

As illustrated in FIG. 5, the partitions that have tags with a higher priority value can be transmitted in the contention-less period. In contrast, partitions that have tags with lower priority values can be transmitted in the contention period according to other prioritized schemes with the four Access Categories. In other embodiments, packets can include a type of service (ToS) field in a header that identifies a type of service. The ToS field can be used to identify the priority of the data to be transferred. The ToS fields can be translated to priority tags as described herein.

Figure 6:
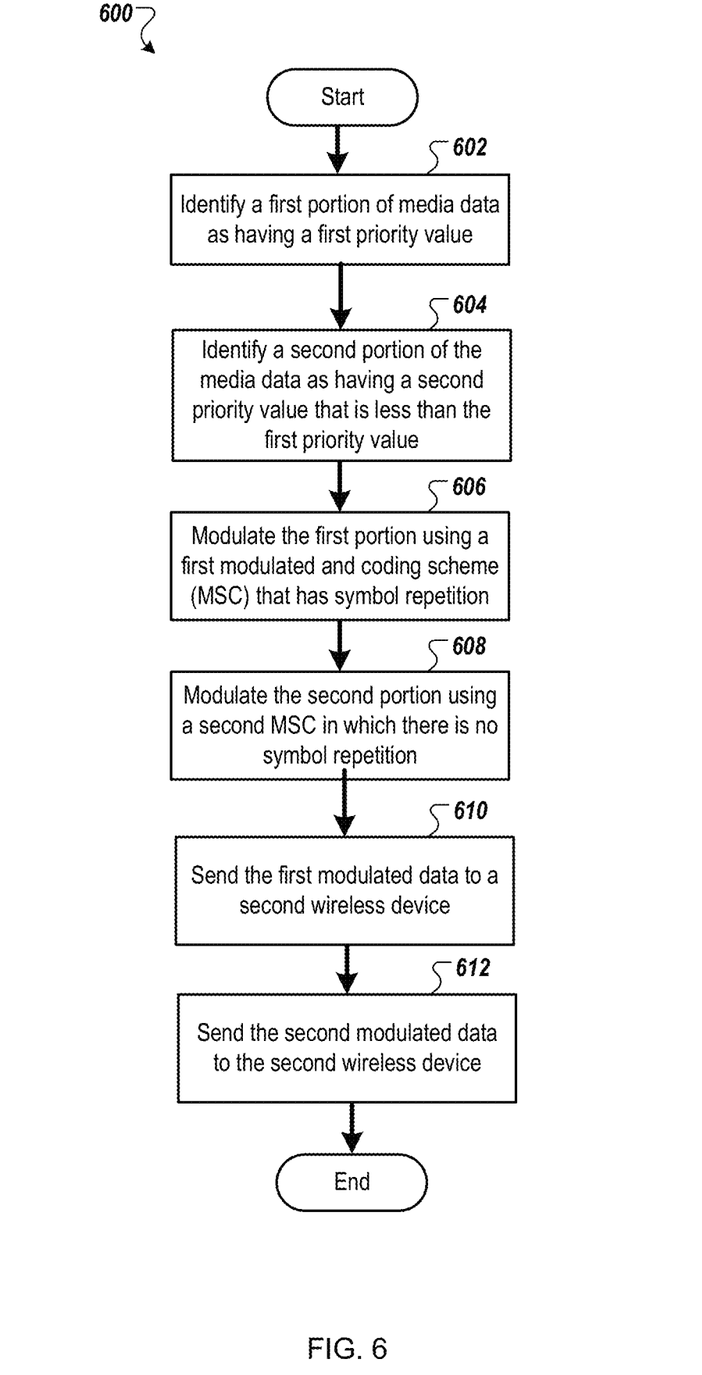
FIG. 6 is a flow diagram of a method of operating a wireless device with prioritized traffic logic for providing media service over an extended-range wireless network, according to one embodiment.

FIG. 6 is a flow diagram of a method 600 of operating a wireless device with prioritized traffic logic for providing media service over an extended-range wireless network, according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by the first wireless device 102 of FIG. 1. In another embodiment, the method 600 is performed by the prioritized traffic logic 106 of FIG. 1. In another embodiment, the method 600 is performed by any wireless device described herein.

Referring back to FIG. 6, the processing logic begins the method 600 by identifying a first portion of media data as having a first priority value (block 602). The processing logic identifies a second portion of the media data as having a second priority value that is less than the first priority value (block 604). The processing logic modulates the first portion using a first modulation and coding scheme (MCS) with symbol repetition to obtain first modulated data (block 606). In at least one embodiment, the first MCS is MCS 10 that uses BPSK with a 1/2 coding rate. The processing logic modulates the second portion using a second MCS in which there is no symbol repetition to obtain second modulated data (block 608). In at least one embodiment, the second MCS is assigned according to a rate controller. The processing logic sends the first modulated data to a second wireless device in the wireless network (block 610). The processing logic sends the second modulated data to the second wireless device after sending the first modulated data (block 612), and the method 600 ends.

In at least one embodiment, the processing logic sends the first modulated data to the second wireless device in a first time slot at block 610 and sends the second modulated data after the first time slot at block 612. In at least one embodiment, the first time slot is part of a RAW in which only the first wireless device is scheduled to transmit. In another embodiment, the processing logic sends the second modulated data in a second period subsequent to the RAW. The second period can be a Non-RAW in which no wireless device is specifically scheduled. In at least one embodiment, the first period (RAW) includes a second time slot in which only a third wireless device is scheduled to transmit.

In at least one embodiment, The processing logic sends the first modulated data in a contention-less period at block 610 and sends the second modulated data in a contention period at block 612 subsequent to the contention-less period.

In at least one embodiment, the processing logic encodes media data into a first data partition of the media data, a second data partition of the media data, and a third data partition of the media data. This can be done using the Data Partitioning (DP) feature in IEEE 802.11ah. The first data partition includes header information that includes a quality parameter and motion vectors. The second data partition includes intra-coded data, and the third data partition includes inter-coded data. The processing logic maps the first data partition and the second data partition to the first portion and maps the third data partition to the second portion. That is, the processing logic maps the first data partition and the second data partition to the first portion that is modulated using the first MCS with symbol repetition. The processing logic maps the third partition to the second portion modulated using the second MCS in which there is no symbol repetition. In a further embodiment, the processing logic sends the first partition and the second partition in a RAW and sends the third partition in a Non-RAW.

In at least one embodiment, the first data partition is a first NALU that contains a first header specifying that the first NALU is a first NALU type. The second data partition is a second NALU that contains a second header specifying a second NALU type. The third data partition is a third NALU that contains a third header specifying a third NALU type. At block 602, the processing logic identifies the first portion as having the first priority value by determining that the first data partition contains the first NALU type in the first header. At block 602, the processing logic also can determine that the second data partition contains the second NALU type. The processing logic can assign a first tag associated with the first priority value to the first NALU and the second NALU. At block 604, the processing logic identifies the second portion as having the second priority value by determining that the third data partition contains the third NALU type and assigning a second tag associated with the second priority value to the third NALU.

In another embodiment, the processing logic identifies the first portion as having the first priority value at block 602 by determining that the first data partition contains a quality parameter, motion vectors, or intra-coded data, and determining that the second data partition contains a quality parameter, motion vectors, or intra-coded data. The processing logic assigns a first tag, having the first priority value, to the first NALU and the second NALU. The processing logic identifies the second portion as having the second priority value at block 604 by determining that the third data partition contains inter-coded data. The processing logic assigns a second tag, having the second priority value, to the third NALU.

In another embodiment, the processing logic identifies the first portion as having the first priority value at block 602 by determining that the first data partition contains a first tag. In at least one embodiment, the first tag can include a first Differentiated Services Code Point (DSCP) value in a Quality of Service (QoS) configuration. In at least one embodiment, the first tag can include a first virtual local area network (VLAN) tag of a QoS prioritization scheme. The processing logic can also determine that the second data partition contains a second tag. In at least one embodiment, the second tag includes a second DSCP value in the QoS configuration. In at least one embodiment, the second tag includes a second LAN tag of the QoS prioritization scheme. The processing logic maps the first tag and the second tag to a third tag associated with the first priority value. The processing logic identifies the second portion as having the second priority value at block 604 by determining that the third data partition contains a fourth tag. In at least one embodiment, the fourth tag includes a third DSCP value in the QoS configuration. In at least one embodiment, the fourth tag includes a third LAN tag of the QoS prioritization scheme. The processing logic maps the fourth tag to a fifth tag associated with the second priority value.

In at least one embodiment, the processing logic stores the first portion (first modulated data after block 606) in a first queue dedicated to portions associated with the first priority value and stores the second portion (second modulated data after block 608) in one of a set of queues shared by portions associated with the second priority value or lower priority values.

Figure 7:
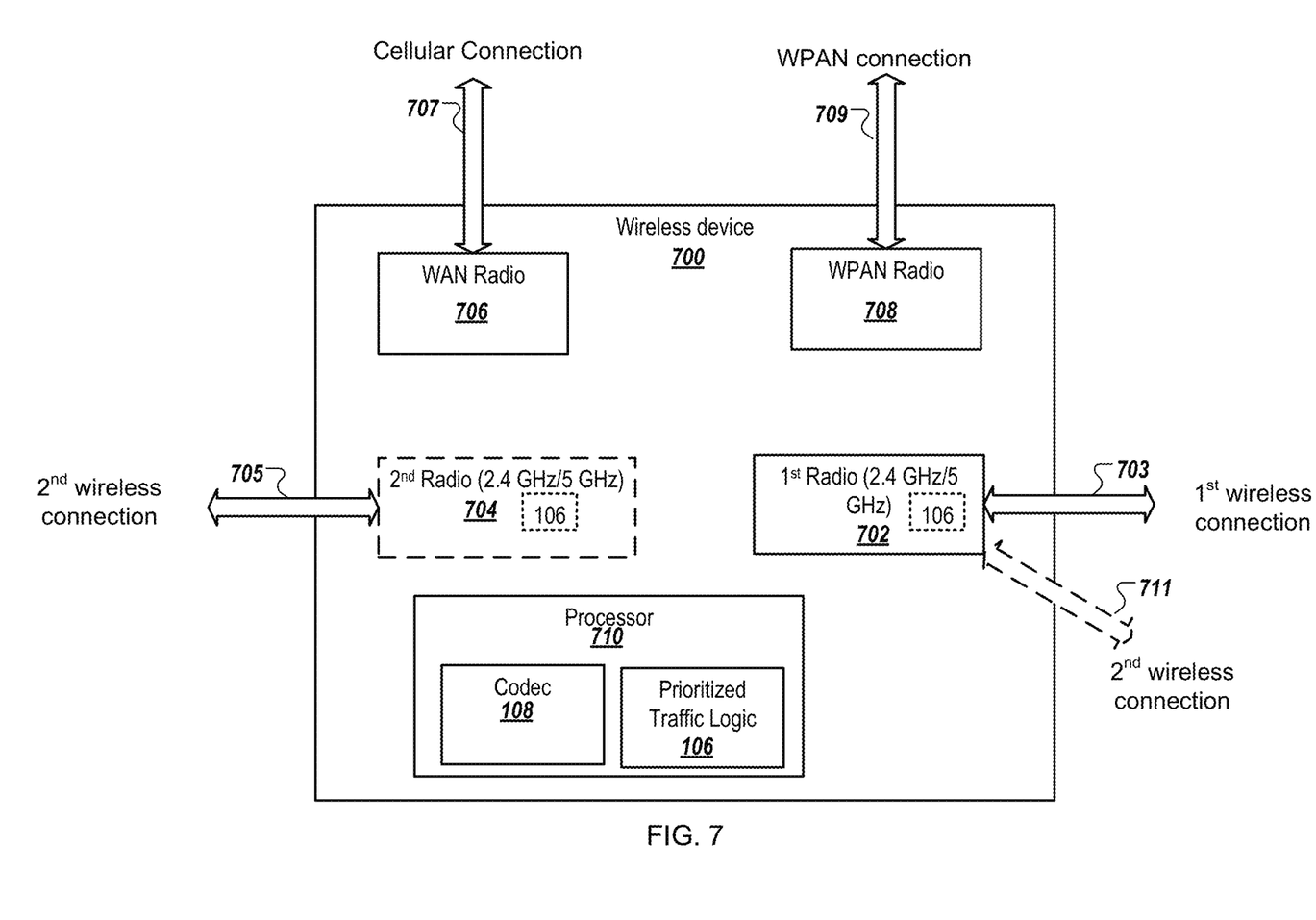
FIG. 7 is a block diagram of a wireless device with multiple radios and prioritized traffic logic for providing media service over an extended-range wireless network, according to one embodiment.

FIG. 7 is a block diagram of a wireless device 700 with multiple radios and prioritized traffic logic for providing media service over an extended-range wireless network, according to at least one embodiment. The wireless device 700 includes a first dual-band radio 702, a second dual-band radio 704, an optional cellular radio 716, an optional wireless personal area network (WPAN) radio 708, and a processor 710. In at least one embodiment, the first dual-band radio 702 is a WLAN radio that can operate in any frequency band, such as the 2.4 GHz, 5 GHz, sub-1 GHz, 6 GHz frequency bands, or the like. The processor 710 can be any type of processing device that can implement operations associated with codec 108 and prioritized traffic logic 106. In some embodiments, the codec 108 is implemented in a separate device from the processor 710. In some embodiments, the prioritized traffic logic 106 is implemented in a baseband processor of the first dual-band radio 702 or the second dual-band radio 704. The first dual-band radio 702 creates a first wireless connection 703 between the wireless device 700 and a second wireless device. The second dual-band radio 704 creates a second wireless connection 705 between the wireless device 700 and a third wireless device in the wireless network. The first dual-band radio 702 can create a third wireless connection 711 between the wireless device 700 and a fourth wireless device (or the same second wireless device) in the wireless network. The second wireless connection 705 can be a peer-to-peer wireless connection or peer-to-multiple-peers wireless connections. The optional cellular radio 716 creates a cellular connection 707 between the wireless device 700 and a device in a cellular network (not illustrated). The optional WPAN radio 708 can create a wireless connection 709 between the wireless device 700 and a device in a WPAN. The WPAN radio 708 can be a radio that implements the Bluetooth® technology, ZigBee® technology, Zwave® technology, or the like. In another embodiment, the wireless device 700 includes a single radio with the prioritized traffic logic 106.

During operation, the codec 108 can generate, from media data, a first portion of the media data and a second portion of the media data. The prioritized traffic logic 106, such as in a baseband processor of the first dual-band radio 702, assigns a first priority value to the first portion and a second priority value to the second portion. The prioritized traffic logic 106 assigns a first MCS that has symbol repetition to the first portion. The first dual-band radio 702 modulates the first portion to obtain the first modulated data using the first MCS with symbol repetition. The prioritized traffic logic 106 assigns a second MCS in which there is no symbol repetition to the second portion. The first dual-band radio 702 modulates the second portion to obtain second modulated data using the second MCS. The first dual-band radio 702 sends the first modulated data to a second wireless device in the wireless network and sends the second modulated data to the second wireless device after sending the first modulated data.

In at least one embodiment, the first dual-band radio 702 can send the first modulated data in a first time slot and the second modulated data after the first time slot. The first time slot can be part of a RAW in which only the first wireless device is scheduled to transmit. In at least one embodiment, the first dual-band radio 702 can send the second modulated data in a second period subsequent to the RAW. The second period can be a Non-RAW in which no wireless device is specifically scheduled. The first period (RAW) can include a second time slot in which only a set of one or more other wireless devices in the wireless network are scheduled. The first period can be a contention-less period, and the second period can be a contention period.

In another embodiment, the codec 108 encodes the media data into a first data partition of the media data, a second data partition of the media data, and a third data partition of the media data, as described herein. The prioritized traffic logic 106 maps the first data partition and the second data partition to the first portion, and the third data partition to the second portion. In at least one embodiment, the first data partition is a first NALU that contains a first header specifying that the first NALU is a first NALU type. The second data partition is a second NALU that contains a second header specifying a second NALU type. The third data partition is a third NALU that contains a third header specifying a third NALU type. The prioritized traffic logic 106 determines that the first data partition contains the first NALU type. The second data partition contains the second NALU type and assigns a first tag associated with the first priority value to the first NALU and the second NALU. The prioritized traffic logic 106 determines that the third data partition contains the third NALU type and assigns a second tag associated with the second priority value to the third NALU. In at least one embodiment, the prioritized traffic logic 106 stores the first portion in a first queue dedicated to portions associated with the first priority value and stores the second portion in one of a set of queues shared by portions associated with the second priority value.

In various embodiments, the wireless device 700 may include memory, storage, one or more wired communication interfaces, two or more wireless communication interfaces, one or more processing devices, or the like. The communication interface, which may include one or more network devices for connecting to the Internet, may be adapted to also wirelessly couple the wireless device 700 to one or more network devices of a first network (e.g., a first AP). The processor 710 can process various data including, for example, topology information, such as node location, historical interference event data (e.g., which devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, dynamic frequency selection (DFS) channels, requirement sets, or the like.

The wireless device 700 can communicate with other devices on a network. The network may be representative of an Internet or WAN connection. Such an Internet or WAN connection may include additional links or trunks, whether wired or wireless, that may involve other types of wideband communication, including those based on cellular standard(s).

Figure 8:
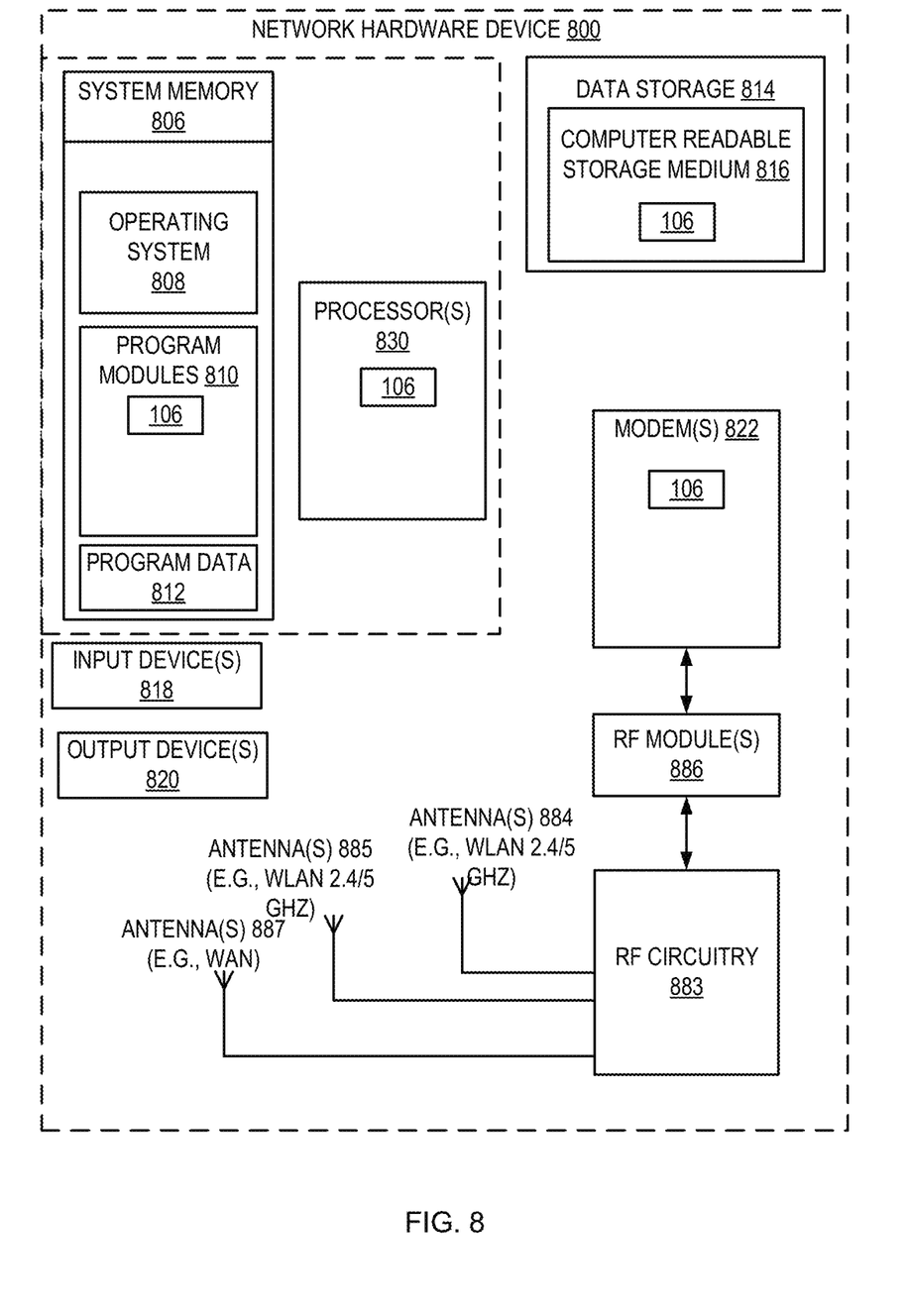
FIG. 8 is a block diagram of a wireless device for providing media service over an extended-range wireless network, according to one embodiment.

FIG. 8 is a block diagram of a wireless device 800 for providing media service over an extended-range wireless network, according to one embodiment. The wireless device 800 may correspond to the mesh network devices described above with respect to FIGS. 1-7. Alternatively, the wireless device 800 may be other electronic devices, as described herein.

The wireless device 800 includes one or more processor(s) 830, such as one or more CPUs, microcontrollers, field-programmable gate arrays, or other types of processors. The wireless device 800 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of methods to control the operation of the wireless device 800. The wireless device 800 performs functions by using the processor(s) 830 to execute instructions provided by the system memory 806. In one embodiment, the program modules 810 may include prioritized traffic logic 106. The prioritized traffic logic 106 may perform some of the operations of reducing medium access contention described herein.

The wireless device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 (e.g., prioritized traffic logic 106) may reside, completely or at least partially, within the computer-readable storage medium 816, system memory 806, and/or within the processor(s) 830 during execution thereof by the wireless device 800, the system memory 806 and the processor(s) 830 also constituting computer-readable media. The wireless device 800 may also include one or more input devices 818 (keyboard, mouse device, specialized selection keys, etc.) and one or more output devices 820 (displays, printers, audio output mechanisms, etc.).

The wireless device 800 further includes a modem 822 to allow the wireless device 800 to communicate via a wireless connection (e.g., such as provided by the wireless communication system) with other computing devices, such as remote computers, an item providing system, and so forth. The modem 822 can be connected to one or more radio frequency (RF) modules 886. The RF module(s) 886 may be a WLAN module, a WAN module, a PAN module, a GPS module, or the like. The antenna structures (antenna(s) 884, 885, 887) are coupled to the RF circuitry 883, which is coupled to the modem 822. The RF circuitry 883 may include radio front-end circuitry, antenna-switching circuitry, impedance matching circuitry, or the like. The antennas 884 may be GPS antennas, NFC antennas, other WAN antennas, WLAN or PAN antennas, or the like. The modem 822 allows the wireless device 800 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to the antenna(s) 884 of a first type (e.g., WLAN 2.4 GHz, 5 GHz, sub-1 GHz, 6 GHz), antenna(s) 885 of a second type (e.g., WLAN 2.4 GHz, 5 GHz, sub-1 GHz, 6 GHz), and/or antenna(s) 887 of a third type (e.g., WAN), via RF circuitry 883, and RF module(s) 886 as described herein. Antennas 884, 885, 887 may be configured to transmit in different frequency bands and/or using different wireless communication protocols. The antennas 884, 885, 887 may be directional, omnidirectional, or non-directional antennas. In addition to sending data, antennas 884, 885, 887 may also receive data, which is sent to appropriate RF modules connected to the antennas. One of the antennas 884, 885, 887 may be any combination of the antenna structures described herein.

In one embodiment, the wireless device 800 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 822 is shown to control transmission and reception via the antenna (884, 885, 887), the wireless device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
    a first processor comprising a codec that receives media data and generates a first data portion of the media data, a second data portion of the media data, and a third data portion of the media data, wherein the first data portion comprises header information that includes a quality parameter and motion vectors, wherein the second data portion comprises intra-coded data, wherein the third data portion comprises inter-coded data, wherein the first processor assigns a first priority value to the first data portion, a second priority value to the second data portion, and a third priority value to the third data portion, the second priority value being lower than the first priority value and the third priority value being lower than the second priority value; and
    a WLAN radio comprising a baseband processor and a transceiver, wherein the baseband processor:
    generates first data from the first data portion using a first modulation and coding scheme (MCS), wherein the first MCS comprises at least two times symbol repetition;
    generates second data from the second data portion using the first MCS;
    generates third data from the third data portion using a second MCS;
    sends the first data and the second data in a first period, the first period being a restricted access window (RAW) in which only the first wireless device is scheduled to transmit; and
    sends the third data in a second period subsequent to the first period, the second period being a contention period.

2. The first wireless device of claim 1, wherein:
    the codec generates the first data portion and the second data portion by dividing the media data into a first subset bitstream temporally or spatially using a scalable video coding (SVC) feature, the first subset bitstream being a base layer of the media data;
    the codec generates the third data portion by dividing the media data into a second subset bitstream using the SVC feature, the second subset bitstream being a second layer of the media data;
    the baseband processor sends the base layer in the first period, wherein the base layer comprises the first data and the second data; and
    the baseband processor sends the second layer in the second period, wherein the second layer comprises the third data.

3. The first wireless device of claim 1, wherein:
    the codec generates the first data portion and the second data portion by dividing the media data into a first slice group using a Flexible Macroblock Ordering (FMO) feature;
    the codec generates the third data portion by dividing the media data into a second slice group using the FMO feature;
    the baseband processor sends the first slice group in the first period, wherein the first slice group comprises the first data and the second data; and
    the baseband processor sends the second slice group in the second period, wherein the second slice group comprises the third data.

4. A method of operating a first wireless device in a wireless network, the method comprising:
    identifying a first portion of media data as having a first priority value, wherein the first portion comprises header information that includes at least one of a quality parameter, motion vectors, or intra-coded data;
    identifying a second portion of the media data as having a second priority value that is less than the first priority value, wherein the second portion comprises inter-coded data;
    modulating the first portion using a first modulation and coding scheme (MCS) that has at least two times symbol repetition to obtain first modulated data;
    modulating the second portion using a second MCS in which there is no symbol repetition to obtain second modulated data;
    sending the first modulated data to a second wireless device in the wireless network; and sending the second modulated data to the second wireless device after sending the first modulated data.

5. The method of claim 4, wherein:
    sending the first modulated data comprises sending the first modulated data in a first time slot; and
    sending the second modulated data comprises sending the second modulated data after the first time slot; and
    the first time slot is part of a restricted access window (RAW) in which the first wireless device is scheduled to transmit.

6. The method of claim 5, wherein sending the second modulated data comprises sending the second modulated data in a second period subsequent to the RAW, the second period being a non-restricted access window (non-RAW) in which no wireless device is specifically scheduled to transmit, wherein the RAW comprises a second time slot in which a third wireless device of the wireless network is scheduled to transmit.

7. The method of claim 4, wherein:
sending the first modulated data comprises sending the first modulated data in a contention-less period; and
sending the second modulated data comprises sending the second modulated data in a contention period subsequent to the contention-less period.

8. The method of claim 4, wherein the first portion comprises a first Network Abstraction Layer Unit (NALU) that contains a first header specifying that the first NALU is a first NALU type and a second header specifying a second NALU type, and wherein the second portion comprises a third NALU that contains a third header specifying a third NALU type, wherein:
identifying the first portion as having the first priority value comprises:
determining that the first portion contains the first NALU type;
determining that the first portion contains the second NALU type;
assigning a first tag associated with the first priority value to the first NALU and the second NALU; and
identifying the second portion as having the second priority value comprises:
determining that the second portion contains the third NALU type; and
assigning a second tag associated with the second priority value to the third NALU.

9. The method of claim 4, wherein:
identifying the first portion as having the first priority value comprises:
determining that the first portion contains a quality parameter, motion vectors, or intra-coded data;
assigning a first tag, having the first priority value, to the first portion; and
identifying the second portion as having the second priority value comprises:
determining that the second portion contains inter-coded data; and
assigning a second tag, having the second priority value, to the second portion.

10. The method of claim 4, wherein:
identifying the first portion as having the first priority value comprises:
determining that the first portion contains a first tag, the first tag comprising at least one of a first Differentiated Services Code Point (DSCP) value in a Quality of Service (QoS) configuration or a first virtual local area network (VLAN) tag of a QoS prioritization scheme;
mapping the first tag to a third tag associated with the first priority value; and
identifying the second portion as having the second priority value comprises:
determining that the second portion contains a second tag, the second tag comprising at least one of a second DSCP value in the QoS configuration or a second LAN tag of the QoS prioritization scheme; and
mapping the second tag to a fourth tag associated with the second priority value.

11. The method of claim 4, wherein the first MCS uses Binary Phase Shift Keying (BPSK) with a 12 coding rate.

12. A first wireless device in a wireless network, the first wireless device comprising:
a processor comprising a codec to generate, from media data, a first portion of the media data and a second portion of the media data, wherein the processor assigns a first priority value to the first portion and a second priority value to the second portion, wherein the first portion comprises header information that includes at least one of a quality parameter, motion vectors, or intra-coded data, wherein the second portion comprise inter-coded data; and
a baseband processor coupled to the codec, the baseband processor to:
modulate the first portion using a first modulation and coding scheme (MCS) that has at least two times symbol repetition to obtain first modulated data;
modulate the second portion using a second MCS in which there is no symbol repetition to obtain second modulated data;
send the first modulated data to a second wireless device in the wireless network; and
send the second modulated data to the second wireless device after sending the first modulated data.

13. The first wireless device of claim 12, wherein the baseband processor is to send the first modulated data in a first time slot and the second modulated data after the first time slot, wherein the first time slot is part of a restricted access window (RAW) in which only the first wireless device is scheduled to transmit.

14. The first wireless device of claim 13, wherein the baseband processor is to send the second modulated data in a second period subsequent to the RAW, the second period being a non-restricted access window (non-RAW) in which no wireless device is specifically scheduled, wherein the RAW comprises a second time slot in which only a third wireless device of the wireless network is scheduled to transmit.

15. The first wireless device of claim 12, wherein the baseband processor is to send the first modulated data in a contention-less period and the second modulated data in a contention period.

16. The first wireless device of claim 12, wherein:
the first portion is at least one of a first Network Abstraction Layer Unit (NALU) that contains a first header specifying that the first NALU is a first NALU type or a second NALU that contains a second header specifying a second NALU type;
the second portion is a third NALU that contains a third header specifying a third NALU type.

17. The first wireless device of claim 12, wherein the baseband processor comprises:
a first queue dedicated to portions associated with the first priority value; and
a set of queues shared by portions associated with the second priority value, wherein the baseband processor stores the first portion in the first queue and the second portion in one of the set of queues.

18. The first wireless device of claim 12, wherein the processor is further to:
identify the first portion as having the first priority value by:
determining that the first portion contains a quality parameter, motion vectors, or intra-coded data; and
assigning a first tag, having the first priority value, to the first portion; and
identify the second portion as having the second priority value by:

determining that the second portion contains inter-coded data; and assigning a second tag, having the second priority value, to the second portion.

\* \* \* \* \*

UNITED STATES PATENT AND TRADEMARK OFFICE
CERTIFICATE OF CORRECTION

| | | |
|---|---|---|
| PATENT NO. | : 11,729,813 B1 | Page 1 of 1 |
| APPLICATION NO. | : 17/336035 | |
| DATED | : August 15, 2023 | |
| INVENTOR(S) | : Haopeng Li, Chunho Lee and Wei Feng | |

It is certified that error appears in the above-identified patent and that said Letters Patent is hereby corrected as shown below:

In the Claims

In Claim 11, Column 17, Line 67 please delete "12" and insert --1/2--

Signed and Sealed this
Twenty-sixth Day of March, 2024

Katherine Kelly Vidal
*Director of the United States Patent and Trademark Office*